(12) United States Patent
Weiss et al.

(10) Patent No.: US 7,685,065 B2
(45) Date of Patent: Mar. 23, 2010

(54) METHOD AND SYSTEM FOR PROVIDING MINIMUM CONTRACT VALUES IN AN ANNUITY WITH LIFETIME BENEFIT PAYMENTS

(75) Inventors: Joseph M. Weiss, Glastonbury, CT (US); C. Dana Tatro, Mendon, MA (US); Maria Leonard Andrade, Suffield, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 138 days.

(21) Appl. No.: 11/788,595

(22) Filed: Apr. 21, 2007

(65) Prior Publication Data

US 2008/0262977 A1    Oct. 23, 2008

(51) Int. Cl.
*G06Q 40/00* (2006.01)

(52) U.S. Cl. .............. 705/39; 705/4; 705/35; 705/36 R; 705/36 T

(58) Field of Classification Search .......... 705/4, 705/35, 36 R, 36 T, 37, 38, 39, 40
See application file for complete search history.

(56) References Cited

U.S. PATENT DOCUMENTS

| 5,754,980 | A | 5/1998 | Anderson |
| 5,878,405 | A | 3/1999 | Grant |
| 5,893,071 | A | 4/1999 | Cooperstein |
| 5,913,198 | A | 6/1999 | Banks |
| 5,926,800 | A | 7/1999 | Baronowski |
| 5,933,815 | A | 8/1999 | Golden |
| 6,049,772 | A * | 4/2000 | Payne et al. ............ 705/4 |
| 6,611,808 | B1 | 8/2003 | Preti et al. |
| 6,611,815 | B1 | 8/2003 | Lewis |
| 6,661,815 | B1 | 12/2003 | Kozlovsky |
| 6,950,805 | B2 | 9/2005 | Kavanaugh |
| 6,963,852 | B2 | 11/2005 | Koresko |
| 7,016,871 | B1 * | 3/2006 | Fisher et al. ............ 705/35 |
| 7,089,201 | B1 | 8/2006 | Dellinger |
| 7,113,913 | B1 | 9/2006 | Davis |
| 7,376,608 | B1 * | 5/2008 | Dellinger et al. ......... 705/36 R |
| 2001/0014873 | A1 | 8/2001 | Henderson |
| 2001/0047325 | A1 | 11/2001 | Livingston |
| 2002/0035527 | A1 | 3/2002 | Corrin |
| 2002/0174045 | A1 | 11/2002 | Arena |
| 2003/0088430 | A1 | 5/2003 | Ruark |
| 2003/0105652 | A1 | 6/2003 | Arena |

(Continued)

OTHER PUBLICATIONS

Anonymous "Risk Management: You've Come a Long Way, Baby." Aug. 1, 2005, Annuity Market News.*

(Continued)

*Primary Examiner*—Kelly Campen
(74) *Attorney, Agent, or Firm*—Howard IP Law Group, PC

(57) ABSTRACT

A data processing method administers a deferred annuity product during the accumulation phase for a relevant life. The annuity product has a contract value, a guarantee of lifetime benefit payments and a minimum contract value. Administration of the product determines a minimum contract value, while paying a lifetime benefit payment and a guaranteed death benefit. The lifetime benefit payment does not reduce the contract value below the minimum contract value. If necessary, the lifetime benefit payment is funded by the general account assets of the company that issues the annuity product.

19 Claims, 1 Drawing Sheet

U.S. PATENT DOCUMENTS

| | | | |
|---|---|---|---|
| 2003/0120570 A1 | 6/2003 | Dellinger | |
| 2003/0171956 A1 | 9/2003 | Cox | |
| 2003/0187764 A1 | 10/2003 | Abbs | |
| 2004/0039601 A1 | 2/2004 | Anderson | |
| 2004/0088236 A1 | 5/2004 | Manning | |
| 2004/0177022 A1* | 9/2004 | Williams et al. | 705/36 |
| 2004/0204951 A1 | 10/2004 | Wood | |
| 2004/0267647 A1 | 12/2004 | Brisbois | |
| 2005/0010453 A1 | 1/2005 | Terlizzi | |
| 2005/0060251 A1 | 3/2005 | Schwartz | |
| 2005/0144124 A1* | 6/2005 | Stiff et al. | 705/39 |
| 2006/0080148 A1 | 4/2006 | Koresko | |
| 2006/0085338 A1* | 4/2006 | Stiff et al. | 705/40 |
| 2006/0089892 A1 | 4/2006 | Sullivan | |
| 2006/0095353 A1 | 5/2006 | Midlan | |
| 2006/0111998 A1 | 5/2006 | Fisher | |
| 2006/0143055 A1 | 6/2006 | Loy | |
| 2006/0149651 A1 | 7/2006 | Robinson | |
| 2006/0155622 A1 | 7/2006 | Laux | |
| 2006/0195375 A1 | 8/2006 | Bohn | |
| 2006/0206398 A1 | 9/2006 | Coughlin | |
| 2006/0206401 A1 | 9/2006 | Abbs | |
| 2006/0212379 A1 | 9/2006 | Perg | |
| 2006/0212380 A1 | 9/2006 | Williams | |
| 2006/0242052 A1* | 10/2006 | Long et al. | 705/35 |
| 2007/0011063 A1 | 1/2007 | Shelon | |
| 2007/0011069 A1 | 1/2007 | Bevacqua | |
| 2007/0011086 A1 | 1/2007 | Dellinger | |
| 2007/0033124 A1* | 2/2007 | Herr et al. | 705/35 |
| 2007/0078690 A1* | 4/2007 | Kohl | 705/4 |
| 2007/0100715 A1 | 5/2007 | O'Donnell | |
| 2007/0100720 A1 | 5/2007 | Bonvouloir | |
| 2007/0100726 A1 | 5/2007 | O'Flinn | |
| 2007/0100727 A1 | 5/2007 | Multer | |
| 2007/0106589 A1 | 5/2007 | Schirripa | |
| 2007/0130035 A1* | 6/2007 | Carden | 705/35 |
| 2007/0162380 A1 | 7/2007 | Conroy | |
| 2007/0198377 A1 | 8/2007 | Livingston | |
| 2008/0010095 A1* | 1/2008 | Joyce | 705/4 |
| 2008/0071661 A1* | 3/2008 | Jeudy et al. | 705/36 R |
| 2008/0189223 A1* | 8/2008 | Baiye | 705/36 R |

OTHER PUBLICATIONS

Anonymous "Full disclosure variable life report.( Policy Analysis )" Nov. 13, 2006, National Underwriter Life & Health, v 110, n 43, p. 30.*

"Income Select for Life" (Transamerica Capital Financial Life Insurance Company), https://www.transamericaadvisor.cony/contentServer/MediaServer? uri=/site/tciidex/media/PDF/Annuities_TCI/Client_Approved_Material/Tips_and_Techniques/.BRIS.pdf.

"Jackson Enhances Living Benefit Options within its Perspective Family of Variable Annuities" (Business Wire Apr. 30, 2007), http://findarticles.com/p/articles/mi_m0E1N/is_2007_April_30/ai_n19041944.

"Glossary of Insurance Terms" (Life Office Management Association, Inc. 2002), http://www.iii.org/media/glossary/.

"Lifetime Legacy" http://www.americo.com/lifetime/lifetime legacy.html.

"Accelerated Death Benefits" (Jan. 22, 2007) http://www.medicare.gov/LongTermCare/Static/AccDeathBenefits.asp?dest=NAV%7CPaying%7CPrivateInsurance%7CAccDeathBenefits.

"Alternatives to Long Term Care Insurance" (SWP Advocates 2004), http://www.senior-wealth.protection-advocates.com/long-term-care-insurance-alternatives.html.

Form 485BPOS, (Apr. 26, 2006), Transamerica-NewLTC-LifetimeGMWB_May2006SECFiling.pdf.

Form N-4, (Feb. 22, 2006), Transamerica-NewLTC-LifetimeGMWB_SECFiling.pdf.

"Fidelity.com Glossary" https://scs.fidelity.com/webxpress/help/topics/help_definition_p.shtml.

"Dynamic Retirement Withdrawal Planning" R.Gene Stout and John B. Mitchell, (Financial Services Review 2006), http://www.rmi.gsu.edu/FSR/abstracts/Vol_15/zux00206000117.pdf.

"Retireonyourterms" http://www.retireonyourterms.com/ glossary/GlossaryText.htm.

"Prudential Investments Introduces Strategic Partners Annuity One: New Variable Annuity Offers Investors World-Class Money Managers and Flexible Product Features" (Business Wire Oct. 9, 2000), http://findarticles.com/p/articles/mi_m0EIN/is_2000_Oct_9/ai_65846822.

"The Power and Protection of Income Annuities" (Empire Fidelity Investments Life Insurance Company), http://personnal.fidelity.com/products/annuities/pdf/IncomeAnnuitySpecialReport.pdf.

"Making IRAs Last a Lifetime with Annuities" (Life Health Advisor, Mar. 2006), http://www.fpamd.org/documents/MakingIRAsLastaLifetimewithAnnuities.pdf.

Prospectus, Penn Mutual Variable Annuity Account III, (Penn Mutual May 1, 2007), PennMutual-LifetimeGMWB-CPI_SECFiling.pdf.

Form 497, (Oct. 2, 2006), Penn-EnhancedCreditVA_May2001_Prospectus.pdf.

"RiverSource Innovations Select Variable Annuity" (River Source Life Insurance Company 2007), http://www.riversource.com/rvsc/global/docs/INNOV-SELECT-NY-AAG.pdf.

"Key to Making Retirement Savings Last: The Withdrawal Rate" (New York Life Insurance Company 2007), http://www.newyorklife.com/msm/cda/main/display/popup/print_this/1,3256,14198,00.html?&site_id=1&docLocation=http://www.newyorklife.com/cda/0,3254,14198,00.html.

"Pacific One Select Investor Guide", (Nov. 2007), http://www.mutualfunds.pacificlife.com/public/mutual_funds/product_info/individual_k/pdfs/d5026.pdf.

"Just the Facts" (Nationwide Financial Services, Inc. 2006-2007) https://ssc.nwservicecenter.com/media/pdf/product/VAM-0504AO-F1.pdf.

* cited by examiner

METHOD AND SYSTEM FOR PROVIDING MINIMUM CONTRACT VALUES IN AN ANNUITY WITH LIFETIME BENEFIT PAYMENTS

BACKGROUND OF THE INVENTION

1. Field of the Invention

The present invention relates to a method and system for providing minimum contract values in an annuity with lifetime benefit payments; and more particularly, to a data processing method for administering an annuity product for a relevant life, the annuity product having a contract value, a guarantee of lifetime benefit payments and a minimum contract value.

2. Description of the Prior Art

An immediate annuity is typically used to provide an income stream within a predetermined length of time from the date the premium is received. The amount of income can be either fixed or variable in nature and typically these products do not provide an account value. A deferred annuity is typically used to provide accumulation and, potentially, a future stream of annuity income. The deferred annuity comprises an accumulation period during which the account value will vary with the underlying investments and an annuitization period where the client purchases an immediate annuity with the account value available. Deferred and immediate annuities typically provide guaranteed income for life which transfers some portion or all of the risk of outliving one's accumulated assets to the insurer.

One basis for distinguishing commonly available deferred annuities is whether the annuity is classified as a "fixed annuity" or a "variable annuity".

In a fixed annuity, the insurer guarantees a fixed rate of interest applicable to each annuity deposit. Therefore, a fixed annuity is desirable for those seeking a "safe" investment. The guaranteed interest rate may apply for a specified period of time, often one year or more. Often, a rate guaranteed for more than one year is called a "multi-year guarantee". The rate credited on a fixed annuity is reset periodically, moving in an amount and a direction that correlate the yields available on fixed-income investments available to the insurer.

With a variable annuity, the annuity contract owner bears the investment risk. The relevant life typically has a choice of funds in which he/she can direct where the annuity deposits will be invested. The various funds, or sub-accounts, may include stocks, bonds, money market instruments, mutual funds, and the like.

Variable annuity contracts typically provide a death benefit. Oftentimes, during the accumulation period, this death benefit is related to the contract value. That is, if the sub-accounts backing the contract value have performed poorly, then the death benefit may be reduced to an insignificant amount. After annuitization, the death benefit can be a function of the remaining payments of the annuity at the time of the relevant life's death. Further, if the annuity contract does not provide a guarantee (GMIB, GMWB, etc.), the contract will terminate when the contract value goes to $0 or some other amount specified in the contract or rider.

Annuity contracts may also provide guarantees in several different variations. A Guaranteed Minimum Death Benefit (GMDB) is a guarantee that provides a minimum benefit at the death of the relevant life regardless of the performance of the underlying investments. A Guaranteed Minimum Income Benefit (GMIB) is a guarantee that will provide a specified income amount at the time the contract is annuitized. The income payment will be dependent on previously stated details set out in the contract. A Guaranteed Minimum Accumulation Benefit (GMAB) is a benefit that guarantees a specified contract value at a certain date in the future, even if actual investment performance of the contract is less than the guaranteed amount. A Guaranteed Minimum Withdrawal Benefit (GMWB) is a guarantee of income for a specified period of time, and in some versions the income stream is guaranteed for life without requiring annuitization as in the guaranteed minimum income benefit. However, this guarantee will automatically annuitize the contract if the contract value is reduced to zero or some other amount specified in the contract or rider.

There remains a need in the art for a data processing method for administering an annuity product for a relevant life wherein the annuity product has a guarantee of lifetime benefit payments. In addition, there is needed a data processing method wherein the annuity product is designed to maintain a minimum contract value while continually paying lifetime benefit payments wherein the minimum contract value helps to prevent the contract value from otherwise being reduced to zero or below another stated amount in the contract or rider which, in that case, would require the contract to annuitize in order to continue lifetime payments.

In addition, there is needed an annuity product wherein, if necessary, the lifetime benefit payments are funded by the general account assets of the company that issues the annuity product, rather than from the contract value, in order to help prevent the contract value from being reduced to zero or below another stated amount in the contract or the rider.

SUMMARY OF THE INVENTION

The present invention provides a data processing method for administering a deferred annuity product during the accumulation phase for a relevant life wherein the annuity product has a guarantee of lifetime benefit payments. Administration is such that the annuity product maintains or guarantees a minimum contract value regardless of the amount of income received as long as the income has been received according to the contract or rider rules contained herein. By maintaining or guaranteeing a minimum contract value, the annuity product provides a death benefit even if the guaranteed death benefit is at or near zero at the time of the relevant life's death. In prior art annuity products, the contract value and death benefit could be depleted by continuing to receive lifetime benefit payments, but by insulating the contract value from withdrawals when it falls to the minimum contract value, the present invention includes a minimum contract value, and similarly death benefit, that are maintained or guaranteed.

The data processing method and system of the invention maintains or guarantees a minimum contract value in an annuity with lifetime benefit payments. The data processing method administers an annuity product having a contract value, together with a guarantee of lifetime benefit payments and the maintenance or guarantee of a minimum contract value.

Generally stated, the method of the invention determines a payment base for the annuity product that is a function of the previous premium payments and withdrawals by the relevant life, and could include investment performance on an annual or other basis (daily, monthly, etc.). The method determines a minimum contract value (MCV) for the annuity product. The MCV may be determined by any of the following formulas:

MCV=(a predetermined percentage)×(the payment base)

MCV=(a predetermined percentage)×(the total premium). Other methods for determining the MCV may be utilized.

The method also determines a guaranteed death benefit amount. During the accumulation phase the system performs the following steps: (i) if requested by the relevant life, periodically accepting premium payments from the relevant life which increase the payment base, the guaranteed death benefit amount, and the contract value; (ii) determining a withdrawal percent; (iii) if requested by the relevant life, or if other defined criteria are reached, periodically paying a guaranteed lifetime benefit payment withdrawal to the relevant life from the contract value which decreases both the contract value and the guaranteed death benefit amount, but will not decrease the contract value below the minimum contract value, wherein the guaranteed lifetime benefit payment is determined by any of the following formulas:

Living Benefit Payment (LBP) withdrawal=(the Payment Base)×(the Withdrawal Percent);

Living Benefit Payment (LBP) withdrawal=(the total premium)×(the Withdrawal Percent);

and (iv) if requested by the relevant life, periodically paying a withdrawal payment—that is in excess of the lifetime benefit payment—to the relevant life from the contract value which decreases each of: the contract value, the payment base, and the death benefit amount, and can decrease the contract value below the minimum contract value. Upon the death of the relevant life, the present method pays a death benefit to a beneficiary, wherein the death benefit is the greater of: (a) the guaranteed death benefit amount; and (b) the present contract value.

In one aspect of the invention, the annuity product of the data processing method is a deferred variable annuity. In another aspect of the invention, the annuity product of the data processing method is a deferred variable annuity and further includes sub-accounts whose market performance can cause the contract value to decrease below the minimum contract value. In other aspects of the invention, the annuity product may be selected from the group of fixed, combination variable/fixed, and equity indexed annuities.

In one aspect of the invention, the predetermined percentage that is used to calculate the minimum contract value is 20%. The predetermined percentage may be any percentage between 0% and 100%. Preferably, the deferred variable annuity of the present invention has a maximum annuity commencement date that is the later of the 10$^{th}$ contract anniversary and the date the relevant life reaches age 90. If the method of the present invention is in the form of a rider, then the administration of the annuity product for the relevant life further comprises the step of: collecting a rider fee. Alternatively, the data processing method for administering an annuity product for a relevant life further comprises the step of: collecting a rider fee only if the current contract value is greater than the minimum contract value; or, in other words, ceasing collection of the rider fee if the current contract value is less than the minimum contract value.

The data processing method for administering an annuity product for a relevant life can further comprise the step of: collecting an account maintenance fee. Alternatively, the data processing method for administering an annuity product for a relevant life can further comprise the step of: collecting an account maintenance fee only if the current contract value is greater than the minimum contract value; or, in other words, ceasing collection of the account maintenance fee if the current contract value is less than the minimum contract value In addition, the account may be subject to M, E & A, 12 b-1 and fund level charges. These charges may or may not be assessed against the contract value if the contract value is below the minimum contract value.

The guaranteed death benefit is paid to the beneficiary only if the relevant life dies during the accumulation phase. However, a guaranteed death benefit may also be payable during annuitization as well. The lifetime benefit payment may also be determined by the following formula:

LBP=the greater of:

(i) "the guaranteed lifetime benefit payment"−(the Payment Base)×(the Withdrawal Percent); and (ii) "the maximum lifetime benefit payment"−(the present Contract Value)×(the Withdrawal Percent).

The lifetime benefit payment may be paid once yearly or periodically throughout the year; however, there is a maximum lifetime benefit payment for any given year. If the contract value would be equal to or less than the minimum contract value, then the guaranteed lifetime benefit payment is paid out of the general account assets of the company issuing the annuity product, and the contract value is not decreased. This feature is an added benefit that provides the relevant life with flexibility and control by continuing to have a contract value, and provides the opportunity to continue to grow that value through investment performance. In prior art annuity products, the relevant life loses any-asset control once the contract value drops to a minimum contract value amount under the annuity rules because, at that time, the contract would either terminate or annuitize.

In one aspect, the value of the annuity payments, if necessary, equals the value of the last guaranteed lifetime benefit payment. In other aspects, excess withdrawals, Required Minimum Distributions or step-ups could cause the value of the annuity payments or guaranteed lifetime benefit payments to change.

In another aspect of the invention, there is provided a data processing method for administering an annuity product for a relevant life, the annuity product having a contract value and a guarantee of lifetime benefit payments and a minimum contract value, comprising the steps of: (i) establishing a minimum contract value; (ii) paying a lifetime benefit payment; and (iii) maintaining a death benefit.

The invention can comprise an annuity product having: (i) means for establishing a minimum contract value; (ii) means for paying a lifetime benefit payment; and (iii) means for maintaining a death benefit. It can also comprise an annuity product having means for insulating a minimum contract value from the effect of withdrawal payments, living benefit rider fees or other dollar-based charges.

In yet another aspect of the invention, there is provided a data processing method for administering an annuity product for a relevant life, the annuity product having a contract value, a guarantee of lifetime benefit payments and the maintenance or guarantee of a minimum contract value, comprising the steps of: (i) determining a payment base for said annuity product; and (ii) determining a minimum contract value (MCV) for said annuity product that is determined by the following formula:

MCV=(a predetermined percentage)×(the payment base).

This formula could also be applied to the premium in another embodiment.

The present invention solves several of the problems associated with conventional administration of annuity products. Maintenance of a minimum contract value aids a relevant life's recovery from low or negative-yield investments. The relevant life is afforded increased security by maintenance of a lifetime benefit payment, a death benefit, and liquidity in the form of a minimum contract value during hardship. If the contract value falls to the minimum contract value, the present invention provides the relevant life with added benefits of maintaining a death benefit, providing continued flexibility of investments, potential relief from paying contract fees, and maintaining control of assets instead of annuitizing the contract.

BRIEF DESCRIPTION OF DRAWINGS

The invention will be more fully understood and further advantages will become apparent when reference is had to the following detailed description of the preferred embodiments and the accompanying drawings, in which.

DESCRIPTION OF THE PREFERRED EMBODIMENTS

Figure 1:
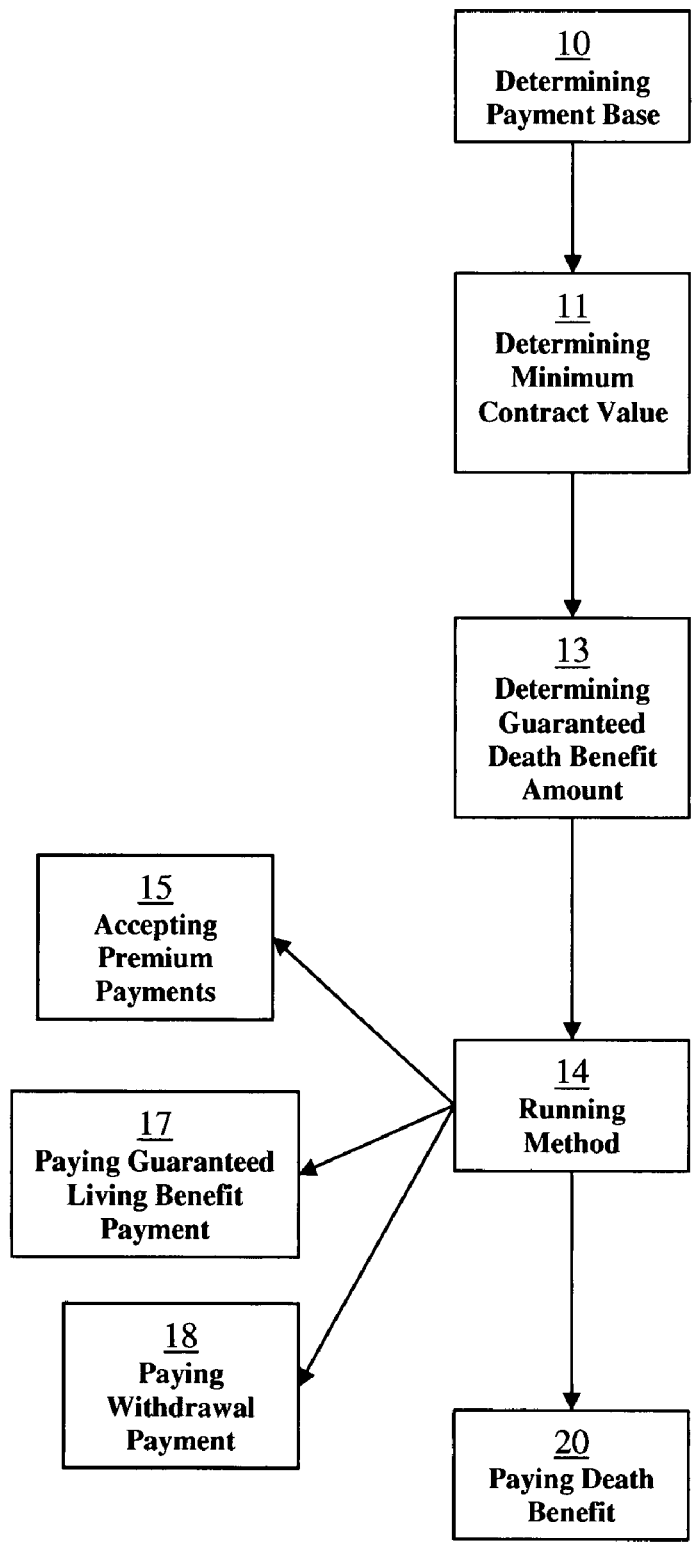
FIG. 1 is a flow chart illustrating a preferred embodiment of the present invention comprising a data processing method for administering an annuity product for a relevant life.

The present invention comprises a data processing method for administering an annuity product having a guarantee of lifetime income and a minimum contract value that never reaches a zero value. (The only way for the minimum contract value to reach zero is if the funds backing the sub-accounts become valueless, or if the relevant life takes withdrawals in excess of the living benefit payment.) The present data processing method is preferably in the form of a rider to a variable annuity contract wherein the rider provides that the relevant life has a minimum contract value. In another aspect of the invention, the present data processing method is not in the form of a rider, but is a part of the base contract. In exchange for paying higher fees, the relevant life receives several advantages by selecting the method and system of the present invention which provides a minimum contract value. These advantages include the following:

First, the relevant life will sustain a death benefit. The death benefit provision, in accordance with the present invention, guarantees that upon death of the relevant life, a death benefit (DB) will be paid to a beneficiary named in the contract. That death benefit payment will be equal to the greater of: (i) the guaranteed death benefit; and (ii) the contract value as of the date the annuity company receives due proof of death. Typically, receiving income payments reduces the death benefit on the contract by reducing the guaranteed death benefit as well as the contract value. However, if the contract value is at or below the minimum contract value, then the contract value is no longer reduced when receiving income payments, and therefore the death benefit is "protected" and will still be there when it typically would have otherwise been exhausted. Further, in one embodiment of the present invention, the minimum contract value is guaranteed, such that the guaranteed death benefit would never fall below the minimum contract value.

Second, compared to prior art methods, the relevant life may receive lifetime benefit payments that continue for a longer period of time prior to the "annuitization period". Some prior art methods force annuitization when the contract value drops down to minimum contract rules. If the product did not annuitize, it could possibly terminate without value. Under the present invention, once the contract value reaches the minimum contract value, the income payments no longer reduce the contract value upon each withdrawal, and therefore the contract value can be maintained or guaranteed for a longer period of time. This would allow the relevant life to maintain additional control over the contract and the investments within the contract.

Third, if applicable, the rider fee and account maintenance fee are waived if the contract value falls below the minimum contract value. Therefore by waiving the fees, this feature is an additional method of maintaining or guaranteeing a minimum contract value. This reduces the cost of the contract for the relevant life.

Fourth, it facilitates potential recovery of the contract value after a sustained period of poor investment returns by allowing the contract value the chance to rebound and increase above the minimum contract value. For example, if the investments in the contract experience enough positive growth, the contract value has an opportunity to increase above the minimum contract value. This would not have been possible if the minimum contract value did not prevent fees and income payments from reducing the contract value once it reaches the minimum contract value.

The present invention comprises a data processing method for administering an annuity product for a relevant life, the annuity product having a contract value and a guarantee of lifetime benefit payments and a minimum contract value, comprising the steps of: (i) establishing a minimum contract value; (ii) paying a lifetime benefit payment; and (iii) maintaining a death benefit. The lifetime benefit payment does not reduce the contract value below the minimum contract value. If necessary, the lifetime benefit payment is funded by the general account assets of the company that issues the annuity product.

The following definitions are given hereunder for terms used in the specification:

"Relevant Life": Depending on the type of annuity product, the term relevant life may refer to any one of the following: an owner, joint owner, annuitant, joint annuitant, co-owner, co-annuitant or beneficiary.

"Minimum Contract Value": A predetermined percentage (preferably 20%, but can be any other pre-selected percentage) of the relevant life's Payment Base or premium on the date of a withdrawal request. It should be understood that in other embodiments of the present invention, other formulas may be utilized for determining the minimum contract value.

"Payment Base (PB)": The Payment Base is the amount used in one embodiment of the present invention to determine the Lifetime Benefit Payment and the Rider Charge. In one embodiment of the present invention, the initial Payment Base equals the initial premium.

"Premium": 100% of the dollar amount of the initial or subsequent premium payments deposited into the contract before application of any sales charges or Payment Enhancements.

"Withdrawal Request": A request made by the relevant life to withdraw funds during the "accumulation phase" of the contract. One type of withdrawal is a Lifetime Benefit Payment. Any withdrawal that is in excess of the lifetime benefit payment may: (i) decrease the contract value below the minimum contract value; (ii) decrease the payment base; and (iii) decrease the guaranteed death benefit.

"Lifetime Benefit Payment": A benefit payment that is available until the death of the relevant life. The lifetime benefit payment may be paid yearly. The total lifetime benefit payment for the year may also be distributed monthly, quarterly or any other defined period. Preferably, if covered life age is 60 (or other predetermined age) or older, then LBP=Payment Base×the WP (withdrawal percent) for the Relevant Life's attained age. Preferably, if the Relevant Life is Age 59 (or other predetermined age) or younger, the LBP is equal to zero. Other age restrictions can also be utilized for the lifetime benefit payment. A lifetime benefit payment withdrawal will not decrease the contract value below the minimum contract value. The lifetime benefit payment may also be determined by the following formula:

LBP=the greater of:

"the guaranteed lifetime benefit payment"−(the Payment Base)×(the Withdrawal Percent); and "the maximum lifetime benefit payment"−(the present Contract Value)×(the Withdrawal Percent).

It should be understood that in other embodiments of the present invention, other formulas may be utilized for determining the lifetime benefit payment.

"Contract Value (CV)": A numerical measure of the relative worth of a Variable Annuity Product during the accumulation phase. The contract value is determined by adding the amount of purchase payments made during the accumulation phase, deducting management fees, deducting contract fees, deducting optional rider fees and surrenders made by the owner, and adjusting for the relative increase (or decrease) of the investment option(s) chosen by the owner. It should be understood that in other embodiments of the present invention, other formulas may be utilized for determining the contract value.

"Sub-account": Variable account investments within the variable annuity contract, such as mutual funds, stocks, and bonds.

"Withdrawal": Also known as a "surrender", a relevant life may withdraw up to the contract value at any time.

"Death Benefit": The death benefit provision guarantees that upon death of the relevant life a death benefit (DB) is paid to a beneficiary named in the contract that is equal to the greater of the Guaranteed Death Benefit or the Contract Value as of the date the annuity company receives due proof of death. It should be understood that in other embodiments of the present invention, other formulas may be utilized for determining the guaranteed death benefit.

"AMF": Annual Maintenance Fee.

"Annuity Commencement Date": Date upon which the contract enters the "annuitization phase".

"Withdrawal Percent (WP)": In one embodiment of the present invention, the Withdrawal Percent is used to determine the amount of the Lifetime Benefit Payment. It should be understood that in other embodiments of the present invention, other formulas may be utilized for determining the lifetime benefit payment.

"PB increase": Payment Base increase.

FIG. 1 is a flow chart illustrating a preferred embodiment of the present invention comprising a data processing method for administering an annuity product for a relevant life. It should be understood that the order of the successive method steps is shown for the sake of illustrating but one example and that the order of method steps can proceed in any variety of orders. In one embodiment of the present invention, the invention comprises a data processing method for administering an annuity product for a relevant life, the annuity product having a contract value and a guarantee of lifetime benefit payments and a minimum contract value. The present method determines a payment base for said annuity product (block 10) that is a function of the previous premium payments and withdrawals by the relevant life. The present method determines a minimum contract value (MCV) for the annuity product (block 11).

The present method determines a guaranteed death benefit amount (block 13). As described below, the guaranteed death benefit amount can change during the accumulation period. At (block 14) the present method runs. During the accumulation phase the system performs the following steps: (i) if requested by the relevant life, periodically accepting premium payments from the relevant life (block 15) which increase the payment base, the guaranteed death benefit, and the contract value; (ii) if requested by the relevant life and the covered life is older than a predetermined age (i.e. 60 years old), periodically paying a guaranteed lifetime benefit payment to the relevant life (block 17) from the contract value which decreases both the contract value and the guaranteed death benefit amount, but will not decrease the contract value below the minimum contract value;

and (iii) if requested by the relevant life, periodically paying a withdrawal payment (block 18)—that is in excess of the lifetime benefit payment—to the relevant life from the contract value which decreases each of: the contract value, the payment base, and the death benefit amount, and can decrease the contract value below the minimum contract value. Upon the death of the relevant life, the present method pays a death benefit (block 20) to a beneficiary, wherein the death benefit is the greater of: (a) the guaranteed death benefit; and (b) the present contract value.

It should be understood that several of the method steps of the present invention (for example blocks 10-13) require the input of a human being in order to be able to determine the respective values. In other words, a computer is not required to use the method of the present invention; that is to say the calculations and appropriate data records may be manually accomplished by hand. For example, in one embodiment of the present invention, the payment base is related to premium payments by the relevant life, wherein some of the premium payments may be discretionary. In one embodiment, the minimum contract value is dependent on a pre-selected percentage selected by the company issuing the annuity and/or the relevant life. Preferably, the pre-selected percentage is fixed and is set by the company issuing the annuity. The annuity commencement date is discretionary and is selected by the company issuing the annuity and/or the relevant life, with certain restrictions. The initial guaranteed death benefit amount is discretionary and is determined by the company issuing the annuity and/or the relevant life. Preferably, the company issuing the annuity sets the initial guaranteed death benefit amount for calculation purposes. In a preferred embodiment, the initial guaranteed death benefit amount is equal to the payment base.

The following detailed illustrative embodiment is presented to provide a more complete understanding of the invention. The specific techniques, systems, and operating structures set forth to illustrate the principles and practice of the invention may be embodied in a wide variety of sizes, shapes, forms and modes, some of which may be quite different from those in the disclosed embodiment. Consequently, the specific structural and functional details disclosed herein are exemplary. They are deemed to afford the best embodiment for purposes of disclosure; but should not be construed as limiting the scope of the invention.

Design:

Although reference is made to a "rider" hereinbelow, it should be understood that the following illustrative example may also be applied to a base product.

1. Premium:

For purposes of this illustrative embodiment, "premium" means 100% of the dollar amount of the initial or subsequent premium payments deposited into the contract before application of any sales charges or Payment Enhancements.

2. Partial Surrender:

For purposes of this illustrative embodiment, the term "partial surrender" means the gross amount of the partial surrender and will include any applicable Contingent Deferred Sales Charges.

3. Covered Life:

The Covered Life, or Relevant Life, is the governing life for determination of the living benefits provided under this illustrative embodiment.

Single Life Election:

If a Natural Owner—the Covered Life is the owner and the joint owner (if any) on the Rider effective date. If a Non-Natural Owner—the Covered Life is the Annuitant on the Rider effective date. All age-contingent benefit provisions are based on the attained age of the OLDEST Covered Life.

Joint/Spousal Continuation Election:

If a Natural Owner—the Covered Life is both the spouses (as defined by Federal Law). All age-contingent benefit provisions are based on the attained age of the YOUNGEST Covered Life.

4. Issue Rules:

(The following Issue Rules are set forth to provide a more complete understanding of this illustrative embodiment of the present invention. It should be understood by those skilled in the art that these issue rules are set forth for illustrative purposes only and that other rules may be utilized. Accordingly, the issue rules set forth below should not be construed as limiting the scope of the invention.)

Maximum Issue Age

Benefit Option 1 These Riders are not available if ANY Covered Life or Annuitant is age 81 (or other predetermined age) or greater on the Rider effective date. Benefit Option 2: These Riders are not available if ANY Covered Life or Annuitant is age 76 (or other predetermined age) or greater on the Rider effective date.

The Rider may be elected on contract issue or post-issue.

Single Life Election: No Additional Requirements

Joint/Spousal Continuation Election:

(This may also Include Co-Annuitants)
One of the following must apply:
If a natural owner purchases Joint/Spousal election, and adds a spousal joint owner, then the owner can name anyone else as the designated beneficiary, because by contract disposition, the joint owner will receive the Death Benefit. If a natural owner purchases Joint/Spousal election, and does not add a joint owner, then the owner must name their spouse as the designated beneficiary. If a non-natural owner purchases Joint/Spousal election, then the annuitant's spouse must be the designated beneficiary.

A joint owner who is not the owner's spouse is not allowed.

5. Withdrawal Percent:

The Withdrawal Percent is used to determine the amount of the Lifetime Benefit Payment.

The WP is determined at the later of; (i) The attained age of the Covered Life on the most recent contract anniversary prior to the first withdrawal, or (ii) The contract anniversary immediately following the Covered Life's $60^{th}$ birthday (or other predetermined age).

Single Life Election:
(Note: the following percentages and ages, if ages are in fact used, can vary)
5.0% for attained ages 60 to 64
5.5% for attained ages 65 to 69
6.0% for attained ages 70 to 74
6.5% for attained ages 75 to 79
7.0% for attained ages 80 and above Joint/Spousal Continuation Election:
4.5% for attained ages 60 to 64
5.0% for attained ages 65 to 69
5.5% for attained ages 70 to 74
6.0% for attained ages 75 to 79
6.5% for attained ages 80 and above.

6. Payment Base (PB):

The PB is the amount used to determine the Lifetime Benefit Payment and the Rider Charge.

SPECIAL NOTE on TOLERANCE: A total partial surrender amount in a Contract Year that exceeds the LBP by not more than $0.12 (the tolerance amount) will be deemed not more than the LBP. This provision recognizes that owners may take the LBP in installments over the year, and the amount of installment may round the proportional distribution amount to the higher cent. Therefore, owners intended to stay within the LBP may exceed it by only a few cents.

Maximum PB is $5,000,000.

At Rider Effective Date: If this Rider is effective on the Contract Issue Date, then the PB equals the X % of the initial premium. If this Rider is effective after the Contract Issue Date, then the PB equals 100% of the dollar amount of the Contract Value on the Rider effective date, less any payment enhancements received in the last 12 months.

When Subsequent Premium Payments are received, the PB will be increased by 100% of the dollar amount of the subsequent premium payment.

Whenever a partial surrender is made prior to the contract anniversary immediately following the Covered Life's $60^{th}$ birthday (or other predetermined age), the payment base is reduced for an adjustment defined below.

"Threshold" definition: 5% Single/4.5% Joint/Spousal multiplied by the greater of the Payment Base or Contract Value at the beginning of the contract year plus subsequent premiums prior to a partial surrender.

For cumulative partial surrenders during each Contract Year that are equal to or less than the Threshold, the adjustment is equal to the dollar amount of the partial surrender.

For any partial surrender that first causes cumulative partial surrenders during the contract year to exceed the Threshold, the adjustment is the dollar amount of the partial surrender that does not exceed the Threshold. For the portion of the withdrawal that exceeds the Threshold, the adjustment is a factor. The factor is as follows:

$1-(A/(B-C))$ where

A=partial surrenders during the Contract Year in excess of the Threshold;

B=Contract Value immediately prior to the partial surrender; and

C=the Threshold, less any prior partial surrenders during the Contract Year. If C results in a negative number, C becomes zero.

For partial surrenders during each Contract Year, where the sum of prior partial surrenders are in excess of the Threshold, the adjustment is a factor. The factor is applied to the Payment Base immediately before the surrender. The factor is as follows:

$$1-(A/B) \text{ where}$$

A=The amount of the Partial surrender;

B=Contract Value immediately prior to the partial surrender.

Whenever a partial surrender is made on or after the contract anniversary immediately following the Covered Life's 60$^{th}$ birthday (or other predetermined age), the PB will be equal to the amount determined as follows:

If the total partial surrenders since the most recent Contract Anniversary are equal to or less than the current Lifetime Benefit Payment (LBP), the PB is NOT reduced by the amount of the partial surrender.

If the total partial surrenders since most recent Contract Anniversary are more than the current LBP, but all partial surrenders were paid under the Automatic Income Required Minimum Distribution (AI RMD), the PB is NOT reduced by the amount of partial surrender.

For any partial surrender that first causes cumulative partial surrenders during the contract year to exceed the current LBP and the RMD exception above does not apply the adjustment is a factor. The factor is as follows:

$$1-(A/(B-C)) \text{ where}$$

A=partial surrenders during the Contract Year in excess of the LBP;

B=Contract Value immediately prior to the partial surrender; and

C=the LBP, less any prior partial surrenders during the Contract Year. If C results in a negative number, C becomes zero.

For additional partial surrender(s) in a contract year, where the sum of all prior Partial Surrenders exceed the current LBP, we will reduce the PB by applying a factor. The factor is as follows:

$$1-(A/B) \text{ where}$$

A=the amount of the partial surrender;

B=Contract Value immediately prior to the partial surrender.

See Section 9. CDSC-Free up to the amount of the LBP.

7. Benefit Increase Provision:

Benefit Option 1

The Withdrawal Percent will be set at the attained age of the first withdrawal and will not increase thereafter.

Benefit Option 2

The benefit increase is facilitated through an increase in the Payment Base.

On every contract anniversary up to and including the contract anniversary immediately following the Covered Life's 80$^{th}$ birthday (or other predetermined age), we will automatically determine if an increase in the PB is applicable. If an increase is applicable, We will automatically increase the PB by the factor below, subject to a minimum of zero and a maximum of 10% (note: the percentage could change or it could be a full step up (no limit)):

(Contract Value prior to Rider Charge taken on current anniversary/Maximum Contract Value)−1 where Maximum Contract Value equals the greater of (A) or (B) below:

(A) the Contract Value on the Rider effective date, plus premiums received after the Rider effective date (B) the Contract Value on each subsequent contract anniversary, excluding the current contract anniversary plus premiums received after the contract anniversary date. (Similar to MAV except that there is no adjustment for withdrawals.)

The WP is locked in on the date of the first withdrawal.

8. Lifetime Benefit Payment (LBP):

The LBP is available until the death of any Covered Life or until the withdrawal benefit is revoked. See details at Section 25. Revoking the Withdrawal Feature.

SPECIAL NOTE on TOLERANCE: A total partial surrender amount in a Contract Year that exceeds the LBP by not more than $0.12 (the tolerance amount) will be deemed not more than the LBP. This provision recognizes that owners may take the LBP in installments over the year, and the amount of installment may round the proportional distribution amount to the higher cent. Therefore, owners intended to stay within the LBP may exceed it by only a few cents.

On the Rider effective date:

If the Covered Life is Age 60 (or other predetermined age) or older on the Rider Effective Date, the LBP is equal to the Payment Base multiplied by the WP for the Covered Life's attained age.

If the Covered Life is Age 59 (or other predetermined age) or younger on the Rider Effective Date, the LBP is equal to zero.

On any contract anniversary immediately following the Covered Life's 60$^{th}$ birthday (or other predetermined age): The LBP is equal to the WP multiplied by the greater of Payment Base or the Contract Value on the anniversary for both the Age-Based and the Market-Based Riders, single and spousal. The LBP can fluctuate year to year due to market performance, but will never be lower than the WP multiplied by the PB as long as the Covered Life has reached the age of 60 (or other predetermined age). Also, if the account value on the anniversary exceeds the PB, the LBP may decrease in future years but will never be less than the PB multiplied by the WP.

When a subsequent premium payment is made after the contract anniversary immediately following the Covered Life's 60$^{th}$ Birthday (or other predetermined age), the LBP is equal to, the greater of: (i) The WP, on the most recent contract anniversary, multiplied by the greater of the PB or contract value immediately after the subsequent premium is received, OR (ii) The prior LBP.

Whenever a partial surrender is made on or after the contract anniversary immediately following the Covered Life's 60$^{th}$ Birthday (or other predetermined age):

If the PB is 0 (zero) due to withdrawals, the LBP is equal to 0 (zero). During the deferral stage, subsequent premiums may be made to re-establish the PB and the LBP.

The LBP will be equal to the amount determined in either one as follows:

If the total partial surrenders since most recent Contract Anniversary are equal to or less than the current Lifetime Benefit Payment (LBP), the LBP is equal to the LBP immediately prior to the partial surrender, OR If the total partial surrenders since most recent Contract Anniversary are more than the current LBP, but all partial surrenders were paid under the Automatic Income Required Minimum Distribution (AI RMD), the provisions of above will apply, OR If the total partial surrenders since most recent Contract Anniversary are more than the current LBP and the AI RMD exception in above does not apply, the LBP is reset to the WP on the most recent contract anniversary multiplied by the greater of the PB or contract value immediately after the partial surrender.

The contract owner may request an amount less than, equal to, or greater than the Lifetime Benefit Payment.

Total partial surrenders taken during a contract year on or after the contract anniversary immediately following the Covered Life's $60^{th}$ birthday (or other predetermined age) which exceed the LBP may reduce future LBP values and may reduce the PB.

If the total amount requested by the contract owner during a contract year is less than the Lifetime Benefit Payment, the excess cannot be carried over to increase future years Lifetime Benefit Payments.

9. CDSC-Free up to the Amount of the LBP

If your LBP exceeds your Actual Withdrawal Amount (AWA) on the most recent contract anniversary, we will waive any Contingent Deferred Sales Charge (CDSC) up to the LBP amount.

10. Death Benefit Before Annuity Commencement Date:

For both Single and Joint/Spousal election, a death benefit may be available on the death of any Owner or Annuitant. For Joint/Spousal election only, no death benefit will be available when a Covered Life is the Beneficiary, and the Beneficiary dies.

The death benefit provision guarantees that upon death we will pay a death benefit (DB) equal to the greater of the Death Benefit or the Contract Value as of the date we receive due proof of death.

The Rider charge is not assessed on death.

When due proof of death is processed, the contract will go into suspense mode. No charges will apply during that period.

The amount available to be paid as a death benefit under the terms of the Rider is a return of premium adjusted for subsequent premium payments and partial surrenders.

At Rider Effective Date:

If this Rider is effective on the Contract Issue Date, then the DB equals the initial premium.

If this Rider is effective after the Contract Issue Date, then the DB equals 100% of the dollar amount of the Contract Value on the Rider effective date, less any bonus payments paid into the contract by the company in the last 12 months.

When a subsequent premium payment is received, the DB will be increased by 100% of the dollar amount of the subsequent premium payment.

If the Withdrawal Feature is revoked, all future withdrawals from the Death Benefit will be fully proportional (but not necessarily proportional) as of the date it is revoked.

Whenever a partial surrender is made prior to the contract anniversary immediately following the Covered Life's $60^{th}$ birthday (or other predetermined age), the death benefit is reduced for an adjustment defined below.

"Threshold" definition: see definition in Payment Base.

For cumulative partial surrenders during each Contract Year that are equal to or less than the Threshold, the adjustment is the dollar amount of the partial surrender.

For any partial surrender that first causes cumulative partial surrenders during the Contract Year to exceed the Threshold, the adjustment is the dollar amount of the partial surrender that does not exceed the Threshold, and the adjustment for the remaining portion of the partial surrender is a factor. The factor is applied to the portion of the Death Benefit that exceed the Threshold. The factor is as follows:

$$1-(A/(B-C)) \text{ where}$$

A=partial surrenders during the Contract Year in excess of the Threshold;

B=Contract Value immediately prior to the partial surrender; and

C=the Threshold less any prior partial surrenders during the Contract Year. If C results in a negative number, C becomes zero.

For partial surrenders during each Contract Year, where the sum of the prior partial surrenders in the year that are in excess of the Threshold, the adjustment is a factor. The factor is applied to the adjusted Death Benefit immediately before the surrender. The factor is as follows:

$$1-(A/B) \text{ where}$$

A=The amount of the Partial Surrender;

B=Contract Value immediately prior to the partial surrender.

Whenever a partial surrender is made on or after the contract anniversary immediately following the Covered Life's $60^{th}$ birthday (or other predetermined age), the DB will be equal to the amount determined as follows:

If the total partial surrenders since the most recent Contract Anniversary are equal to or less than the current Lifetime Benefit Payment (LBP), the DB becomes the DB immediately prior to the partial surrender, less the amount of partial surrender, less the amount of partial surrender paid out of the General Account of the Company, OR If the total partial surrenders since most recent Contract Anniversary are more than the current LBP, but all partial surrenders were paid under the Automatic Income RMD (AI RMD), the DB becomes the DB immediately prior to the partial surrender, less the amount of partial surrender, less the amount of partial surrender paid out of the General Account of the Company, OR If the total partial surrenders since the most recent Contract Anniversary exceed the total current LBP and the AI RMD exception in does not apply, the adjustment is the dollar amount of the partial surrender that does not exceed the LBP, and the adjustment for the remaining portion of the partial surrender is a factor. The factor for is applied to the portion of the Death Benefit that exceeds the LBP. The factor is as follows:

$$1-(A/(B-C)) \text{ where}$$

A=partial surrenders during the Contract Year in excess of the LBP;

B=Contract Value immediately prior to the partial surrender.

C=LBP less any prior partial surrenders during the contract year. If C results in a negative number, C=0 (zero).

For partial surrenders during each Contract Year, where the sum of the prior partial surrenders in the year that are in excess of the current LBP, the adjustment is a factor. The factor for Adjustments for Partial Surrenders for the Death Benefit is applied to the adjusted Death Benefit immediately before the surrender. The factor is as follows:

$$1-(A/B) \text{ where}$$

A=The amount of the Partial Surrender;

B=Contract Value immediately prior to the partial surrender.

11. Contract Value Reduces Below our Minimum Contract Value Rules:

The Minimum Contract Value (MCV) is defined as [20%] of Your Payment Base on the date of a withdrawal request. Lifetime Benefit Payments cannot reduce the Contract Value below this minimum threshold. Only subaccount performance and withdrawals in excess of the LBP can decrease the Contract Value below the MCV.

If total partial surrenders since the most recent Contract Anniversary are less than or equal to the difference between the Contract Value and the Minimum Contract Value (MCV), the Contract Value will be reduced by the total partial surrender.

If the Contract Value at the time of a partial surrender is less than or equal to the MCV, the Contract Value will NOT be decreased for the partial surrender. The requested partial surrender will be paid out of the General Account assets of the Company.

If the Contract Value immediately before the partial surrender is greater than the MCV, but would drop below the MCV after the partial surrender, the Contract Value will be liquidated to pay the LBP only to the extent it would equal the MCV. The remaining portion of the LBP that is not funded by the Contract Value will be paid out of the General Account assets of the company.

12. Covered Life Change:

Any contractual change before ACD which causes a change (defined below) in the Covered Life will result in a reset in the benefits provided under this Rider and allows us to impose the Fund Allocation restrictions as seen in Section 17.

Covered Life changes in the first 6 months of the contract issue date (or other time period) will not cause a change in the DB or PB. However, the WP and LBP may change based on the attained age of the Covered Life after the Covered Life change.

If the Covered Life is changed and a withdrawal has been taken, both within the first 6 months from contract issue date (or other time period), then the LBP and WP will be calculated at the time of the Covered Life change and will be based on the new Covered Life's attained age on the rider effective date.

If the Covered Life is changed and a withdrawal has NOT been taken, both within the first 6 months from contract issue date (or other time period), then the LBP and WP will be calculated upon the first withdrawal:
  If the first withdrawal is after the first 6 months and before the first contract anniversary (or other time period), then the LBP and WP will be based on the new Covered Life's attained age on the rider effective date.
  If the first withdrawal occurs after the first contract anniversary, then the LBP and WP will be calculated based on the new Covered Life's attained age on the most recently attained contract anniversary.
  If the oldest Covered Life after the change is greater than the age limitation of the Rider at the time of the change, then the Rider will terminate, and the Death Benefit will be equal to Contract Value.

Single Life Election:

Covered Life changes after the first 6 months of contract issue date will cause a reset in the benefits.

If the oldest Covered Life after the change is equal to or less than age limitation of the Rider at the time of the change, then either below will automatically apply.

If the Rider is not currently available for sale, We will revoke the Withdrawal Feature of this Rider.

We will continue the existing Rider with respect to the death benefit only.

The Death benefit will be recalculated to the lesser of Contract Value or the DB on the effective date of the Covered Life Change.

The Rider charge is assessed on the revocation date, and then will no longer be assessed.

If the Rider is currently available for sale, We will continue the existing Rider with respect to all benefits, at the current Rider charge.

The PB will be reset to the minimum of the Contract Value or the PB on the date of the change.

The DB will be reset to the minimum of the Contract Value or the DB on the date of the change.

The WP and LBP will be recalculated on the date of the change and will be based on:
  A. If withdrawals are taken prior to the first Contract Anniversary, we will use the new Covered Life's attained age on the rider effective date.
  B. If withdrawals are taken after the first Contract Anniversary, we will use the new Covered Life's attained age on the contract anniversary prior to the first withdrawal.

The Maximum Contract Value will be recalculated to equal the contact value on the date of the covered life change.

If the oldest Covered Life after the change is greater than the age limitation of the Rider at the time of the change, then the Rider will terminate, and the Death Benefit will be equal to Contract Value.

If the rider is no longer available for sale and we have changed the issue age of the rider (to be determined on a non-discriminatory basis), and a Covered Life change occurs, and they exceed that newly determined age limitation, then Rider will terminate, and the Death Benefit will be equal to Contract Value.

Joint/Spousal Continuation Election:

Covered Life changes after the first 6 months of contract issue date, If You and Your Spouse are no longer married, for reasons other than death, then Covered Life Changes may occur as follows:
  If Surrenders have not been taken from the contract, then the PB, the DB and the Max Contract Value remain the same; Covered Life will be reset and the WP scale will be based on the youngest Covered Life as of the date of the change, AND
  You may remove Your spouse as Covered Life.
  You may remove Your spouse as a Covered Life and replace your original spouse with your new spouse, (these changes do not have to happen on the same day).
  If Surrenders have been taken from the contract, then you may remove your spouse. The PB, the DB and the Max Contract Value remain the same; The WP scale will be based on the attained age of the remaining Covered Life as of the date of the change. Any changes other than removing the spouse will follow the rules of below.
  If the oldest Covered Life after the change is greater than (older) to the age limitation of the Rider at the time of the change, then the Rider will terminate. The Death Benefit will be equal to Contract Value.

If any other contractual change causes a change in the Covered Life, then either will automatically apply:
  If the oldest covered life after the change is equal to or less than (younger) the age limitation of the rider at the time of the change, then We will revoke the Withdrawal Feature of this Rider, (see Section 25). We will continue the existing Rider with respect to the death benefit only. The Rider charge is assessed on revocation date, and then will no longer be assessed.

If the oldest Covered Life after the change is greater than (older) the age limitation of the Rider at the time of the change, then the Rider will terminate. The Death Benefit will be equal to Contract Value.

If the rider is no longer available for sale and we have changed the issue age of the rider (to be determined on a non-discriminatory basis), and a Covered Life change occurs, and they exceed that newly determined age limitation, then Rider will terminate, and the Death Benefit will be equal to Contract Value.

If the Spouse dies and is the Primary Beneficiary and the Covered Life, then the owner may remove them from the contract. The PB, DB and Max Contract Value will remain the same. The WP will be recalculated as follows:

If there has been a partial surrender since the rider effective date, then WP will remain at the current percentage.

If there has NOT been a partial surrender since the rider effective date, then WP be based on the attained age of the remaining covered life on the contract anniversary prior to the first surrender.

13. Spousal Continuation:

Single Life Election:

In the event that the Contract Owner dies and Spousal Continuation is elected, we will increase the Contract Value to the DB value (the greater of the Contract Value and the DB).

The Covered Life will be re-determined on the date of the continuation.

If the Covered Life is less than age 81 (or other predetermined age) at the time of the continuation, then either of the below will automatically apply:

If the Rider is not currently available for sale. We will revoke the Withdrawal Feature of this Rider, (see Section 25). We will continue the existing Rider with respect to the death benefit only. The Rider charge is not assessed on revocation date, and then no longer assessed, OR If the Rider is currently available for sale, We will continue the existing Rider with respect to all benefits, at the current Rider charge.

The Payment Base and the Death Benefit will be set equal to the Contract Value on the continuation date.

The LBP and WP will be recalculated on the continuation date. The WP will be recalculated based on the age of the oldest Covered Life on the effective date of the spousal continuation. If the WP had previously been locked in, then it will become unlocked and can change based on the next withdrawal.

The Maximum Contract Value will be set to Contract Value on the continuation date.

If the Covered Life is greater than or equal to age 81 (or other predetermined age) at the time of the continuation. The Rider will terminate. The Death Benefit will be equal to Contract Value.

Joint/Spousal Continuation Election:

In the event that the Contract Owner dies and Spousal Continuation is elected, we will increase the Contract Value to the DB value (the greater of the Contract Value and the DB). The spouse may elect to either:

Continue the contract and Rider

We will continue the existing Rider with respect to all benefits, at the current contract Rider charge. The Payment Base will be equal to the greater of Contract Value or Payment Base on the continuation date. The LBP will be recalculated to equal the Withdrawal percent multiplied by the greater of Contract Value or Payment Base on the continuation date. The Maximum Contract Value will be the greater of Payment Base or Contract Value on the continuation date. The DB will be equal to the bumped up Contract Value on the continuation date. The WP recalculation rule:

The WP will remain at the current percentage if there has been a Partial Surrender since the Rider effective date.

If there has not been a Partial Surrender, the WP will be based on the attained age of the remaining Covered Life on the Contract Anniversary prior to the first surrender/withdrawal.

The contract owner can NOT name a new owner on the contract.

The contract owner CAN name a new beneficiary on the contract. Any new beneficiary added to the contract will not be taken into consideration as a covered life.

The Rider will terminate upon the death of the surviving Covered Life. OR

Continue the contract and revoke the Withdrawal Feature of the Rider. The charge is assessed on revocation date, and then no longer assessed. LIF only, See Section 25.

The Covered Life will be re-determined on the date of the continuation date for death benefit purposes.

If the Covered Life is greater than the age limitation at the time of continuation, the Rider will terminate. The Death Benefit will be equal to Contract Value 14. Effect of Death of the Owner or the Annuitant Before the Annuity Commencement Date:

Single Life Election:

| If the Deceased is | And... | And... | Then the... |
|---|---|---|---|
| Contract Owner | There is a surviving contract owner | The annuitant is living or deceased | Joint contract owner receives the DB, Rider terminates |
| Contract Owner | There is no surviving Contract Owner | The annuitant is living or deceased | Rider terminates Designated Beneficiary receives DB |
| Contract Owner | There is no surviving Contract Owner or Beneficiary | The annuitant is living or deceased | Rider terminates Estate receives DB |
| Annuitant | Contract Owner is living | There is no contingent annuitant and the contract owner becomes the contingent annuitant | Contract continues, no DB is paid, Rider continues |
| Annuitant | Contract Owner is living | There is no contingent annuitant and the contract owner waives their right become the contingent annuitant | Rider terminates, contract owner receives DB |
| Annuitant | Contract Owner is living | contingent annuitant is living | Contingent annuitant becomes annuitant and the contract and Rider continues |
| Annuitant | Contract Owner is non-natural person | There is no contingent annuitant | Contract owner receives DB, Rider terminates |

Joint/Spousal Continuation Election:

Contingent Annuitant becomes Annuitant

If the annuitant dies where there is a Contingent Annuitant (who is different from the Owner/Annuitant), then the rider continues and all provisions of the rider remain the same, there are no resets nor DBs paid. Upon the death of the last surviving Covered Life, a DB is paid to the beneficiary, and the rider terminates.

| If the Deceased is... | And... | And... | Then the... |
|---|---|---|---|
| Contract Owner | There is a surviving contract owner | The annuitant is living or deceased | The surviving contract owner continues the contract and Rider, we will increase the contract value to the death benefit value. |
| Contract Owner | There is no surviving Contract Owner | The annuitant is living or deceased | If the spouse is the sole primary beneficiary, follow spousal continuation rules for joint life elections |
| Contract Owner | There is no surviving Contract Owner or Beneficiary | The annuitant is living or deceased | Rider terminates Estate receives DB |
| Annuitant | Contract Owner is non-natural person | | If the spouse is the sole primary beneficiary, follow spousal continuation rules for joint life elections |
| Annuitant | The Owner is living | There is a living Contingent Annuitant | The rider continues; upon the death of the last surviving Covered Life, the rider will terminate. |

15. Effect of Death after the Annuity Commencement Date:

Single Life Election:

| If the Deceased is | And... | And... | Then the... |
|---|---|---|---|
| Annuitant | The annuitant is also the contract owner | Fixed Lifetime and Period Certain is elected | The lifetime contingency ceases. The remaining DB is paid under Period Certain. |

Joint/Spousal Continuation Election:

| If the Deceased is... | And... | And... | Then the... |
|---|---|---|---|
| Annuitant | The annuitant is also the contract owner, and there is no surviving Joint Annuitant | Fixed Lifetime and Period Certain is elected | The lifetime benefit ceases. The remaining DB is paid under Period Certain. |
| Annuitant | The annuitant is also the contract owner, and there is a surviving Joint Annuitant | Fixed Joint and Survivor Lifetime and Period Certain is elected | Lifetime Benefit continues until death of last surviving annuitant |

16. Rider Charge:

Rider charge is equal to (Option 1—30 bps; Option 2—40 bps; or other formula) multiplied by the Payment Base on each contract anniversary. Contract Anniversary Date is the day of the anniversary; all processing after the end of the trade date. (Other methodology could be used.)

(Note: other orders of transactions are possible.)
First—all other financial transactions.
Second—take the AMF.
Third—calculate PB increase (Option 2).
Fourth—Take the Rider Charge If the Contract Value on the Contract Anniversary Date is less than or equal to the MCV, the AMF and Rider Charge are waived.

In case of total surrender, a pro rata share of the Rider charge is equal to the Rider charge percentage multiplied by the PB, multiplied by the number days since the last contract anniversary (not to exceed 365 days), divided by 365. If the Rider effective date is after the Contract Issue date, the period between the Rider effective date and the next contract anniversary will constitute a contract year. The prorated charge will be assessed for this Contract Year.

The Rider charge is withdrawn from each investment option in the same proportion that the value of the investment option bears to the Contract Value.

Includes all investment options, including the Fixed Accumulation Feature.

Does not include the DCA Plus feature. Any money in the DCA Plus feature is deducted from the contract value for purposes of determining the proportional value of each investment option.

If a surrender is taken on any other date other than the contract anniversary and such surrender causes the total surrenders during the year to exceed the LBP and reduces the contract value to below the minimum account rules in affect on the valuation day of the surrender, we will deduct a pro rata share of the Rider charge from the amount otherwise payable.

The minimum amount does not include the fee.

The rider fee is not taken if the surrender amount is within the annual LBP.

The Rider charge will be discontinued once an Annuity Option available under the contract or Rider becomes effective.

The Rider charge may be limited on fixed accounts based on state specific regulations.

We reserve the right to increase or decrease the charge for new issue only, up to a predetermined maximum charge percentage anytime (e.g. 0.75%).

For Option 1, no charge increase will apply once issued (although it could possibly change in other forms).

For Option 2, We reserve the right to increase the Rider charge up to a maximum predetermined rate (e.g. 0.75%) at anytime.

We will only increase the charge on Riders eligible for future Benefit increases.

No charge increase will apply once the Covered Life reaches age 80 (or other predetermined age).

If we increase the Rider charge, the contract owner has the following options:

Accept the rider charge increase and continue to receive automatic PB increases at contract anniversary, OR
Decline the charge increase and no longer receive automatic PB increases at contract anniversary.

If the contract owner denies the charge increase, they will not be able to accept the charge increase at a later date.

We will reserve the right to charge a different rider charge depending on the participation in approved investment options.

17. Fund Allocation Restrictions:

We reserve the right to restrict investment in any investment option in the case of a change of Covered Life after six months. If the investment option restriction is imposed by Us, the contract owner has the following options, Reallocate all existing money and all new premium to a non-restricted investment option, an available asset allocation program, or fund-of-fund investment option as we may offer from time to time, OR Revoke the Withdrawal Feature.

If the restrictions are violated, the Withdrawal feature will be revoked. The Death Benefit continues as is upon the date of revocation.

18. Aggregation:

For purposes of determining the PB under this Rider, We reserve the right to treat one or more deferred variable annuity contracts issued by Us to You with this Rider attached in the same calendar year as one contract. If Hartford elects to aggregate contracts, we will change the period over which we measure withdrawals against the Benefit Payment.

We will treat the effective date of our election until the end of the calendar year as a Contract Year for the purposes of the LBP limit. A pro rata Rider charge will be taken at the end of that calendar year. As long as total withdrawals in that period do not exceed the LBP, the withdrawals will not necessitate a reset.

In future calendar years, the LBP limits will be aggregated and will be on a calendar year basis. In other words, withdrawals under all aggregated contracts in a calendar year will be compared against the combined LBP limits for the aggregated contracts.

If withdrawals exceed those combined limits, the aggregate PB will be set to the combined Contract Values of the aggregated contracts. The, LBP, will then equal Withdrawal Percent multiplied by the new PB.

If withdrawals do not exceed those combined limits, each withdrawal will reduce the PB dollar for dollar. The withdrawal benefits relating to the Contract Value reaching zero will not apply until the Contract Value of all aggregated contracts reaches zero.

The Rider charge will be taken at the end of each calendar year. It will be deducted pro rata from all of the sub-accounts and fixed accounts of the aggregated contracts.

If the Contract Values of all aggregated contracts are reduced below our minimum account rules in effect, we will offer the annuity options as defined earlier in this spec. The options will pay the combined LBP.

19. Annuity Commencement Date

If the annuity reaches the maximum ACD, which is the later of the $10^{th}$ contract anniversary and the date the annuitant reaches age 90, the contract must be annuitized unless we and the Owner(s) agree to extend the ACD. In this circumstance, the contract may be annuitized under our standard annuitization rules, but under no circumstances will the amount payable be less than your LBP, provided that the certain period does not exceed the Death Benefit remaining at the ACD divided by the LBP.

Single Life Election:

We will issue You a Fixed Lifetime and Period Certain Payout.

The lifetime portion will be based on the Covered Life determined at ACD. The Covered Life is the Annuitant for this payout option.

If there is more than one Covered Life then the lifetime portion will be based on both Covered Lives. The Covered Lives will be the Annuitant and Joint Annuitant for this payout option. The lifetime portion will terminate on the first death of the two.

The minimum amount paid to You under this Annuity Option will at least equal the remaining DB under this rider.

If the oldest Annuitant is age 59 (or other predetermined age) or younger, We will automatically defer the date the payments begin until the oldest Annuitant attains age 60 (or other predetermined age) and is eligible to receive payments in a fixed dollar amount until the later of the death of any Annuitant or a minimum number of years.

If the Annuitant(s) are alive and age 60 (or other predetermined age) or older, You will receive payments in a fixed dollar amount until the later of the death of any Annuitant or a minimum number of years.

The minimum number of years that payments will be made is equal to the remaining DB under this rider divided by the product of the payment base on the ACD multiplied by the greater of the WP and 5% Single (4½% Spousal).

$$\text{Single Election: } \frac{DB}{PB \times \text{Max}(WP, 5\%)}$$

$$\text{Joint/Spousal Election: } \frac{DB}{PB \times \text{Max}\left(WP, 4\frac{1}{2}\%\right)}$$

This annualized amount will be paid over the greater of the minimum number of years, or until the death of any Annuitant, in the frequency that You elect.

The frequencies will be among those offered by Us at that time but will be no less frequently than annually.

If, at the death of any Annuitant, payments have been made for less than the minimum number of years, the remaining scheduled period certain payments will be made to the Beneficiary. A lump sum option is not available.

Joint/Spousal Continuation Election:

The minimum amount paid to You under this Annuity Option will at least equal the DB under this rider.

If the younger Annuitant is alive and age 59 (or other predetermined age) or younger, we will automatically defer the date that payments begin until the younger Annuitant attains age 60 (or other predetermined age) and is eligible to receive payments in a fixed dollar amount until the death of the last surviving Annuitant or a minimum number of years.

If the Annuitants are alive and the younger Annuitant is age 60 or older (or other predetermined age), you will receive payments in a fixed dollar amount until the death of the last surviving Annuitant or a minimum number of years.

The minimum number of years that payments will be made is equal to the remaining DB under this rider divided by the LBP at annuitization.

This annualized amount will be paid over the greater of the minimum number of years, or until the death of the last surviving Annuitant, in the frequency that You elect.

The frequencies will be among those offered by Us at that time but will be no less frequently than annually. If, at the death of the last surviving Annuitant, payments have been made for less than the minimum number of years, the remaining scheduled period certain payments will be made to the Beneficiary. A lump sum option is not available. If both spouses are alive, We will issue You a Fixed Joint & Survivor Lifetime and Period Certain Payout. The Covered Life and Covered Life's spouse will be the Annuitant and Joint Annuitant for this payout option. The lifetime benefit will terminate on the last death of the two. If one spouse is alive, We will issue You a Fixed Lifetime and Period Certain Payout. The lifetime portion will be based on the Covered Life. The Covered Life is the Annuitant for this payout option. The lifetime benefit will terminate on the last death of the Covered Life.

20. Assignment

The benefits under this Rider cannot be assigned.

21. Free Look Provision

If the Free Look Provision under the contract is exercised, the Rider will terminate.

22. Availability

Subject to state approval, this Rider will be made available on all currently available products issued on or after the date the Rider is launched for sale in the state of issue. This does not imply post-issue election. Post-issue election will be determined on an as needed basis. Product—See product Requirements for Complete List 23. Optional Benefits Principal First: No
Principal First Preferred: No
Lifetime Income Builder: No
MAV/PLUS: YES MAV: Yes in states and distribution firms where MAV/PLUS is not available Premium Security: No 24. Premium Restrictions Prior company approval is required on all subsequent premium payments received after the first 12 months. Approval Rules:

We will not accept any subsequent premium payment which brings the total cumulative subsequent premiums in excess of $100,000 without prior approval.

Payment enhancements and employee gross-up are not to be included in premium total.

25. Revoking the Withdrawal Feature

Benefit Option 1

At any time following the earlier of Spousal Continuation or $5^{th}$ anniversary of the Rider effective date, the Contract Owner may elect to revoke the Withdrawal Feature of the Rider. The Payment Base will go to Zero and the Withdrawal Percent will go to Zero, and LBP will go to Zero.

On the date the withdrawal feature is revoked, a pro rata share of the Rider charge is equal to the Rider charge percentage multiplied by the PB, multiplied by the number days since the last charge was assessed, divided by 365. The Rider Charge will be assessed on revocation date, and then will no longer be assessed.

The Death Benefit continues as is upon the date of the revocation.

No other living benefit may be elected upon the revocation of the Withdrawal Feature.

Benefit Increase Option 2

The Contract Owner can not elect to revoke the Withdrawal Feature however The Hartford can revoke the Withdrawal Feature in certain circumstances. See specific sections on Ownership and Spousal Continuation.

26. Post-Issue Election

If the rider effective date is after the contract issue date, then the period between the rider effective date and the next contract anniversary will constitute a contract year.

27. Product-Specific Features & Impacts

The Employee Gross-Up is not considered premium for purposes of the payment base and death benefit.

Payment Enhancements are not considered premium for purposes of the payment base and death benefit.

Front-end Loads are not taken from the premium for purposes of the payment base and death benefit.

The following description and examples further illustrate the preferred features of the present invention.

The "Minimum Contract Value" is defined as a predetermined percentage [i.e. 20%] of your Payment Base on the date of a withdrawal request. Lifetime Benefit Payment (LBP) withdrawals cannot reduce the Contract Value below this minimum threshold. Only sub-account performance and withdrawals in excess of the LBP can decrease the Contract Value below the Minimum Contract Value. For example, if the Payment Base is $100,000, the Minimum Contract Value is equal to $20,000 (20% of $100,000).

Each time a Lifetime Benefit Payment withdrawal request is received, a test will be performed on the Contract Value to determine if it is below the Minimum Contract Value or would drop below the Minimum Contract Value due to the requested LBP. If a requested Lifetime Benefit Payment would drop the Contract Value below the Minimum Contract Value, the Contract Value will be liquidated to pay the LBP only to the extent it would equal the Minimum Contract Value. The remaining portion of the LBP that is not funded by the Contract Value will be paid out of the General Account assets of the company. The Guaranteed Death Benefit is reduced by the full amount of the LBP regardless of whether the LBP is paid from the Contract Value or the General Account of the company. See Example 1 below.

Example 1

LBP withdrawal request=$5,000
Current Contract Value=$23,000
Minimum Contract Value=$20,000
Guaranteed Death Benefit=$20,000
In this situation, the $5,000 request would drop the Contract Value to $18,000 if it were to be paid entirely from the Contract Value, which is lower than the Minimum Contract Value. Therefore, the Contract Value will only drop to the Minimum Contract Value of $20,000, and the remaining $2,000 will be funded by the General Account assets of the company.
Therefore, the request will be processed as follows:
LBP paid=$5,000
New Contract Value=$20,000 (equals the Minimum Contract Value)
New Guaranteed Death Benefit=$15,000 ($20,000 minus the $5,000 LBP)
At death, the Death Benefit would be the greater of the Contract Value and the Guaranteed Death Benefit, which in this case would be $20,000
Amount paid from the Contract Value=$3,000 (reduces the Contract Value to the Minimum Contract Value)
Amount paid from the General Account of the company=$2,000 (the difference between the LBP and the amount paid out from the Contract Value)
If the Contract Value is below the Minimum Contract Value on the date of the requested LBP, the LBP will be paid entirely out of the General Account assets of the company, and the Contract Value will not be reduced. See Example 2 below.

Example 2

LBP withdrawal request=$5,000
Current Contract Value=$10,000
Minimum Contract Value=$20,000
Guaranteed Death Benefit=$4,000
The request will be processed as follows:
LBP paid=$5,000
New Contract Value=$10,000
New Guaranteed Death Benefit=$0
At death, the Death Benefit would be the greater of the Contract Value and the Guaranteed Death Benefit, which in this case would be $10,000

Note the Guaranteed Death Benefit is reduced by the amount of the LBP, and will not drop below $0.

If the withdrawal request is in excess of the LBP, then the Payment Base and the Death Benefit will all be proportionally reduced by the excess withdrawal amount. The Contract Value, even if it is below the Minimum Contract Value, will also be reduced by the amount of the excess withdrawal.

If applicable, the rider fee will not be collected if the Contract Value is equal to or less than the Minimum Contract Value on the Contract Anniversary. If the Contract Value on the Contract Anniversary is higher than the Minimum Contract Value, the rider fee would be assessed, but would never drop the Contract Value below the Minimum Contract Value. (For example, if the Contract Value is $20,100, the Minimum Contract Value is $20,000 and the rider fee is $400, only a $100 rider fee will be collected, and the remaining $300 will be waived.)

The AMF (Account Maintenance Fee) will not be collected if the Contract Value is equal to or less than the Minimum Contract Value on the Contract Anniversary. If the Contract Value on the Contract Anniversary is higher than the Minimum Contract Value, the AMF would be assessed, but would never drop the Contract Value below the Minimum Contract Value.

In addition, the account may be subject to M, E & A, 12 b-1 and fund level charges. These charges may or may not be assessed against the contract value if the contract value is below the minimum contract value.

Since the fees typically assessed against the contract are not collected if the Contract Value drops below the Minimum Contract Value, the Contract Value can never reduce to $0 unless the funds backing the sub-accounts become valueless or a full liquidation is taken.

The product will have a maximum Annuity Commencement Date which is the later of the $10^{th}$ contract anniversary and the date the annuitant reaches age 90. Asset-based trail commissions will continue to be paid until annuitization. If the total Contract Value is withdrawn, the contract will terminate.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A data processing method for administering a deferred annuity product during the accumulation phase with a computer, comprising:

receiving information regarding providing the deferred annuity product for a relevant life with a communications module, wherein the deferred annuity product has a contract value, a plurality of lifetime benefit payments, and a minimum contract value, wherein the information regarding the deferred annuity product is received from a contract owner;

determining a payment base for the deferred annuity product with a processor, wherein the payment base is a function of the premium payments made by or on behalf of the relevant life and a function of the plurality of lifetime benefit payments received by the relevant life;

determining a minimum contract value for the deferred annuity product with the processor, wherein the minimum contract value exceeds at least one lifetime benefit payment of the plurality of lifetime benefit payments for the lifetime of the relevant life;

receiving one or more premium payment or payments from or on behalf of the relevant life with the communications module, wherein the premium payments are received during the accumulation phase, and further wherein the premium payments increase the payment base, increase a guaranteed death benefit amount, and increase the contract value;

transmitting via the communications module, the lifetime benefit payments to the relevant life, wherein the lifetime benefit payments are a function of a predetermined withdrawal percentage, wherein the lifetime benefit payments are guaranteed for the lifetime of the relevant life, wherein the lifetime benefit payments reduce the contract value, and further wherein excess withdrawal payments made in excess of the lifetime benefit payment or payments decrease the contract value, wherein said contract value does not fall below the minimum contract value and a death benefit amount does not fall below the contract value if the deferred annuity product makes periodic lifetime benefit payments that do not contain the excess withdrawal payment or payments during the lifetime of the relevant life.

2. The data processing method of claim 1, wherein the contract value does not decrease below the minimum contract value if withdrawal payments in excess of the lifetime benefit payments are not made during the lifetime of the relevant life.

3. The data processing method of claim 2, wherein the minimum contract value is one of a predetermined percentage of the payment base or a predetermined percentage of a total of the premium payments received during the accumulation phase.

4. The data processing method of claim 3, wherein the predetermined percentage is between 0% and 100%.

5. The data processing method of claim 1, wherein the lifetime benefit payment is determined by the following formula:

lifetime benefit payment=[the Payment Base]×[the Withdrawal Percent].

6. The data processing method of claim 5, wherein the withdrawal percent is a function of the relevant life's age.

7. The data processing method of claim 6, wherein the first lifetime benefit payment made determines the Withdrawal Percent for the deferred annuity product.

8. The data processing method of claim 1, wherein the deferred annuity product is a variable annuity product.

9. The data processing method of claim 8, wherein the variable annuity product includes sub-accounts, wherein market performance of the sub-accounts cause the contract value to decrease below the minimum contract value.

10. The data processing method of claim 1, wherein the deterred annuity product is a fixed annuity.

11. The data processing method of claim 1, wherein a commencement date for the deferred annuity product is the later of the $10^{th}$ contract anniversary and the date the relevant reaches age 90.

12. The data processing method of claim 1, further comprising collecting a rider fee.

13. The data processing method of claim 12, further comprising collecting a rider fee only if the contract value is greater than the minimum contract value.

14. The data processing method of claim 13, further comprising collecting an account maintenance fee.

15. The data processing method of claim 14, further comprising collecting an account maintenance fee only if the contract value is greater than the minimum contract value.

16. The data processing method of claim 1, wherein the lifetime benefit payment is determined by the following formula:

LBP=the greater of (i) "the guaranteed lifetime benefit payment"−[the Payment Base]×[the Withdrawal Percent]; and (ii) "the maximum lifetime benefit payment"−[the Contract Value]×[the Withdrawal Percent].

17. The data processing method of claim 1, wherein the lifetime benefit payment is paid periodically.

18. The data processing method of claim 1, further comprising making the lifetime benefit payments from the General Account Assets of the company issuing the annuity product if the contract value is equal to or less than the minimum contract value.

19. The data processing method of claim 1, wherein the minimum contract value is guaranteed for the life of the contract.

* * * * *